United States Patent
Butterbach et al.

(10) Patent No.: US 6,677,394 B1
(45) Date of Patent: Jan. 13, 2004

(54) SWELLABLE HOTMELT ADHESIVE

(75) Inventors: Ruediger Butterbach, Essen (DE); Ulrike Maassen, Neuss (DE); Siegfried Kopannia, Krefeld (DE); Marcus Heemann, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 165 days.

(21) Appl. No.: 08/991,365

(22) Filed: Dec. 16, 1997

(30) Foreign Application Priority Data

Dec. 18, 1996 (DE) .......................... 196 52 762

(51) Int. Cl.⁷ ................................ C08K 5/05
(52) U.S. Cl. ..................... 524/388; 524/47; 524/56; 524/379; 524/387; 524/394; 524/522; 524/523; 524/524; 524/563; 524/564
(58) Field of Search ............... 524/47, 56, 394, 524/379, 522, 523, 524, 563, 564, 387, 388

(56) References Cited

U.S. PATENT DOCUMENTS

| | | | |
|---|---|---|---|
| 4,590,227 A | 5/1986 | Nakamura et al. | 523/130 |
| 4,791,240 A | 12/1988 | Marin et al. | 174/23 |
| 4,837,077 A | 6/1989 | Anton et al. | 428/240 |
| 5,138,685 A | 8/1992 | Arroyo et al. | 385/113 |
| 5,179,611 A | 1/1993 | Umeda et al. | 385/110 |
| 5,188,883 A | 2/1993 | Rawlyk | 428/189 |
| 5,240,995 A | 8/1993 | Gyory et al. | 525/57 |
| 5,246,770 A | 9/1993 | Bottiglione et al. | 428/244 |
| 5,261,021 A | 11/1993 | Pasta et al. | 385/100 |
| 5,278,217 A | 1/1994 | Umeda et al. | 524/394 |
| 5,410,629 A | 4/1995 | Arroyo | 385/109 |
| 5,654,062 A | 8/1997 | Chabagno et al. | 428/76 |
| 5,672,633 A | 9/1997 | Brehm et al. | 521/53 |
| 5,698,615 A | 12/1997 | Polle | 523/173 |
| 5,712,316 A | 1/1998 | Dahmen et al. | 521/72 |
| 5,715,343 A | 2/1998 | Anelli et al. | 385/100 |
| 5,721,295 A | 2/1998 | Bruggemann et al. | 524/44 |
| 5,736,595 A | 4/1998 | Gunther et al. | 524/45 |
| 5,925,461 A | 7/1999 | Fairgrieve | 428/372 |
| 6,167,179 A | 12/2000 | Weiss et al. | 385/103 |

FOREIGN PATENT DOCUMENTS

| | | |
|---|---|---|
| DE | 2006359 | 8/1971 |
| EP | 0 188 959 | 7/1986 |
| EP | 0489967 | 6/1992 |
| EP | 0475778 | 5/1996 |
| JP | 58/215334 | 12/1983 |
| JP | 3176332 | 7/1991 |

OTHER PUBLICATIONS

US 5,020,875, 6/1991, Arroyo et al. (withdrawn)
Draht und Kabelpanorama, pp. 64–68, May/Jun./Jul. (1988).

*Primary Examiner*—Edward J. Cain
(74) *Attorney, Agent, or Firm*—Stephen D. Harper

(57) ABSTRACT

Thermoplastic compositions based on a water-insoluble component of one or more thermoplastic copolymers and one or more resins with a saponification number and a water-soluble or water-dispersible component and a water-swellable component from the class of superabsorbers are suitable as water-swellable hotmelt adhesives. Such water-swellable hotmelt adhesives are preferably used for the production of watertight constructions, more particularly for the production of longitudinally watertight cable constructions.

56 Claims, 1 Drawing Sheet

SWELLABLE HOTMELT ADHESIVE

This application claims priority of German Patent Application 196 52 762.7, filed Dec. 18, 1996.

FIELD OF THE INVENTION

This invention relates to a water-swellable thermoplastic bonding and coating composition based on a water-insoluble component, a water-soluble or water-dispersible component and a water-swellable component. The invention also relates to the use of this thermoplastic composition for the production of watertight constructions, more particularly for the production of longitudinally watertight cable constructions.

BACKGROUND OF THE INVENTION

A number of constructions, for example pipelines and, in particular, underground or underwater cables, have to be protected against penetrating water at junctions and joints or in the event of damage to their outer casings. Power and/or telecommunications cables in particular are long-life capital goods whose reliability has to be guaranteed over a very long period. In the event of damage to the outer insulation and/or at faulty junctions, water penetrates into such cable constructions and can cause serious damage to the cable. Water can spread rapidly along the cable so that a cable damaged in this way can be become unusable over long stretches.

To prevent water from penetrating into such constructions, it has been common practice for some time to use water-swellable sealing materials or sealing constructions. JP-A-58-215334 (83) describes in general terms heat-curing sealing materials based on rubbers and a water-swellable polyurethane resin based on ethylene oxide/propylene oxide copolymers.

According to the prior art, multilayer sealing systems are used for the production of longitudinally watertight power and telecommunications cables. Thus, in "Draht und Kabelpanorama", May/June/July 1988, W. Schäfer and P. Graber describe swellable "nonwovens" of an extremely homogeneous swelling layer, consisting of a mixture of a synthetic hydrogel former (swelling powder) with chemically pure cellulose pulp as filler, and a high-strength carrier layer of polyester fibers with polyester filaments as an additional reinforcing element. These two layers are thermally united solely by applying heat and high pressure, i.e. without using low-melting thermoplastics. Swellable bandages are then made from these nonwovens or yarns and wrapped around the bundle of wires, optionally together with an inner plastic sheath.

EP-A-188 959 describes a multilayer sealing tape consisting of a support of paper, textiles or plastics which are coated with a layer of a water-swellable polymeric powder and a water-soluble binder and optionally a surfactant.

U.S. Pat. No. 5,020,875 describes cable constructions in which the layer intended to keep water out by swelling consists of a multilayer laminate. This laminate consists of two support tapes of a hydrophobic material, for example polyester. A water-swellable polymer or copolymer of the superabsorber type is arranged between these two support tapes.

U.S. Pat. No. 5,188,883 describes a multilayer composite structure of a metal tape as one layer and a layer of a swellable water-blocking material, these two layers and surfaces being joined by an adhesive.

SUMMARY OF THE INVENTION

The invention is a water-swellable thermoplastic bonding and coating composition comprising a water-insoluble component A, wherein component A comprises at least one water-insoluble (co)polymer and at least one other resin, a water-soluble or water-dispersible component B, wherein component B comprises at least one water-soluble or water-dispersible oligomer and/or (co)polymer, and a water-swellable component C, wherein component C comprises a water-swellable (co)polymer, wherein components A, B and C are homogeneously mixed and its use in watertight constructions, more particularly for the production of longitudinally watertight cable constructions.

DETAILED DESCRIPTION OF THE INVENTION

Figure 1:
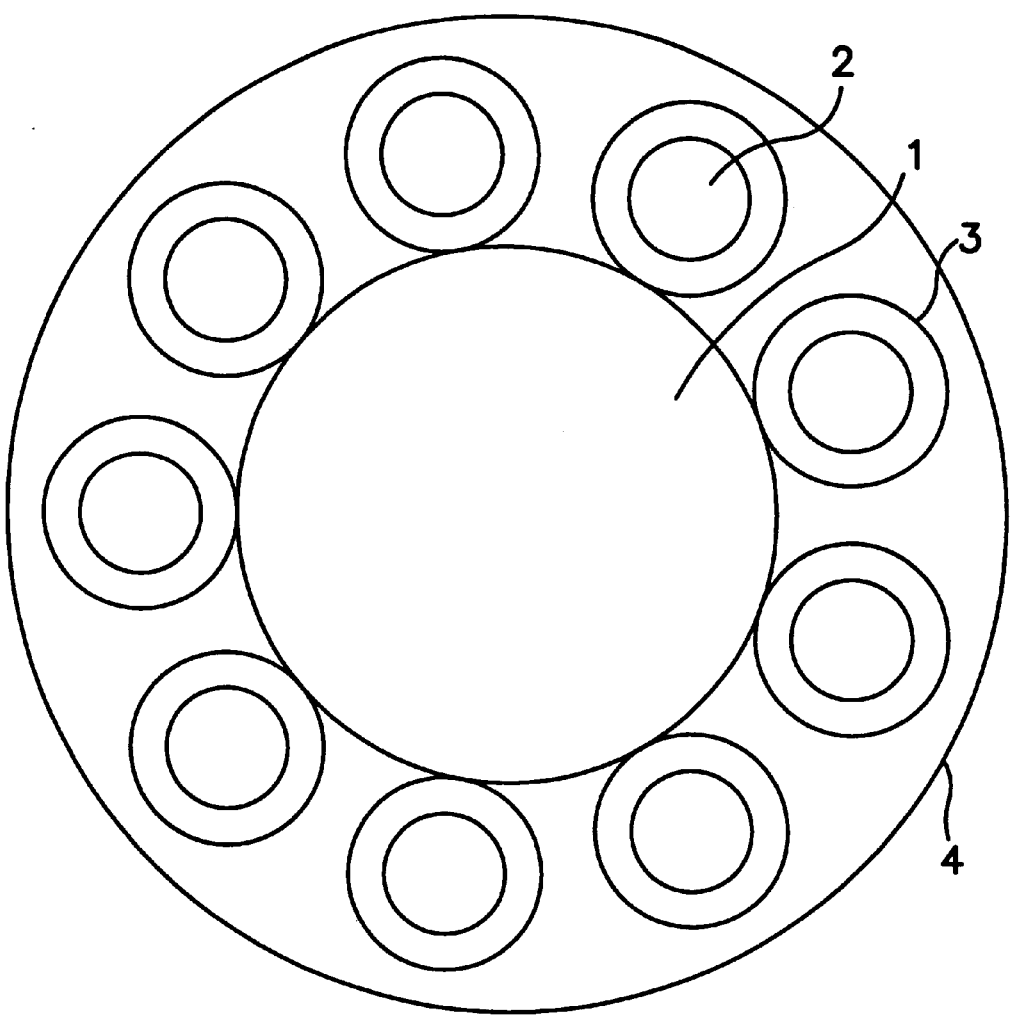
FIG. 1 is a schematic cross-section through an optical cable using the swellable hotmelt adhesives of one embodiment of the invention.

The use of the multilayer materials mentioned above for the production of longitudinally watertight cable constructions is complicated and expensive on account of the number of steps involved. Accordingly, the problem addressed by the present invention was to provide products which would enable longitudinally watertight cable constructions to be more simply produced.

According to the invention, this problem has been solved by a water-swellable thermoplastic composition which consists essentially of three components:

A.) a water-insoluble component containing at least one water-insoluble polymer or copolymer and at least one other substantially water-insoluble resin, B.) a water-soluble or water-dispersible component containing at least one water-soluble or water-dispersible oligomer and/or polymer or copolymer, C.) a water-swellable component consisting of a water-swellable homopolymer or copolymer, components A, B and C being homogeneously mixed. "Homogeneously mixed" in the context of the present invention is supposed to mean that the matrix of the composition has no macroscopic inhomogeneities. This does not imply that different phases consisting of the water-insoluble component and the water-soluble or water-swellable component are present in the microscopic range. More particularly, homogeneously mixed is not intended to mean that the water-swellable homopolymer or copolymer of component C is molecularly dissolved in one or both of the other components.

Accordingly, these water-swellable thermoplastic compositions are hotmelt adhesives which may be used in particular in cable constructions.

Basically, the water-insoluble homopolymer or copolymer of component A may be selected from any thermoplastic polymers known per se for use in hotmelt adhesives including, for example, polyamides, copolyamides, polyaminoamides, polyesters, polyacrylates, polymethacrylates, polyolefins and, in particular, ethylene/vinyl acetate copolymers or mixtures of one or more of the polymers mentioned.

Any tackifying resins known per se except for pure hydrocarbon resins may be used as an additional resin of component A to increase the tackiness of the melt. Accordingly, the resins to be used in accordance with the invention have a saponification number different from 0. The various colophony derivatives, i.e. in particular the resin esters of abietic acid, are particularly suitable for this purpose although other polyterpenes and terpene/phenol resins may also be used.

Various water-soluble or water-dispersible oligomers or homopolymers or copolymers are suitable for the constituents of component B, including for example polyethylene glycols with molecular weights of 400 to 20,000, polyvinyl methyl ether, polyvinyl pyrrolidone, copolymers of vinyl methyl ether or vinyl pyrrolidone, polyvinyl alcohols, water-soluble or water-dispersible polyesters or copolyesters, water-soluble or water-dispersible acrylate polymers.

The water-swellable component C may be selected from any homopolymers and/or copolymers which, as hydrophilic materials, are capable of absorbing and retaining large amounts of water, even under pressure, without immediately dissolving in the water. Hydrophilic materials such as these are also known as "superabsorbers" and include, for example, graft copolymers of starch or cellulose with acrylonitrile, acrylic acid or acrylamide, carboxymethyl cellulose, maleic anhydride/poly-α-olefin copolymers, polyacrylamide, polyacrylic acid and salts of polyacrylic acid and optionally copolymers of acrylic acid or acrylamide with acrylate esters.

Depending on the application envisaged, the hotmelt adhesives according to the invention may have surface-tacky properties or tack-free surfaces for so-called "non-blocking" versions. These particular versions contain wax additives known per se, more particularly bis-stearamide waxes. In addition, both versions of the hotmelt adhesives according to the invention may contain commercial stabilizers known per se which provide the formulations with thermal stability.

Particularly preferred surface-tacky swellable hotmelt adhesive compositions contain the following components:

15 to 45% by weight of resin esters or terpene/phenol resins;
15 to 40% by weight of thermoplastic copolymer, more particularly ethylene/vinyl acetate copolymer;
5 to 20% by weight of acrylate copolymers;
5 to 30% by weight of polyethylene glycols;
5 to 15% by weight of polyvinyl ethyl ethers, water-soluble or water-dispersible acrylate polymers or water-soluble or water-dispersible copolyesters;
15 to 50% by weight of powder-form polyacrylic acid salt, polyacrylamide or similar powder-form superabsorbers; and
0.2 to 2.0% by weight of commercial stabilizers.

Particularly preferred swellable hotmelt adhesive formulations in the non-blocking version contain:

15 to 45% by weight of resin esters, terpene/phenol resins or the like;
15 to 40% by weight of thermoplastic (co)polymer, more particularly ethylene/vinyl acetate copolymer;
5 to 25% by weight of polyethylene glycols;
15 to 50% by weight of powder-form superabsorbers, more particularly polyacrylic acid salt;
0.2 to 2.0% by weight of stabilizer; and
0.5 to 5.0% by weight of waxes, more particularly ethylene bis-stearamide.

The water-swellable hotmelt adhesives according to the invention are suitable, for example, as a coating for metal foils or glass-fiber-reinforced plastic reinforcing elements in cable constructions. A particularly preferred application, for example, is the direct coating of the central reinforcing element in optical cables. This central element may be coated with the non-surface-tacky version of the adhesive and then rolled up and stored. In standard optical cables, the individual optical fibers are arranged concentrically around this central element. After reactivation of the non-surface-tacky version of the adhesive on the central element, the optical fibers may be directly bonded to the central element and may then pass through further stages of the production process. The plastic tubes containing the optical fiber(s) may optionally be externally coated with the hotmelt adhesive according to the invention. The hotmelt adhesives according to the invention eliminate the need for the otherwise necessary wrapping of the optical fibers in a water-swellable multilayer adhesive tape or multilayer non-woven and the additional longitudinal waterproofing of the voids between the central element and the tubes with a petrojelly. These voids which arise out of the design of the cable construction can be left in the construction because the water-swellable hotmelt adhesive completely fills them whenever water penetrates and triggers the swelling process, so that reliable longitudinal waterproofing is guaranteed. This type of construction simplifies cable splicing, eliminates the need for petrojelly and significantly reduces the weight of the cable. In addition, higher production speeds are possible compared with swelling yarns.

In the surface-tacky version, the hotmelt adhesive according to the invention is directly applied to the central element and/or the optical fiber in the cable construction line so that the hotmelt adhesive does not have to be reactivated.

FIG. 1 is a schematic cross-section through an optical cable using the swellable hotmelt adhesives according to the invention. The central element 1 is surrounded by several tubes 2 containing optical fibers. A coating 3 of the swellable hotmelt adhesive around the optical fibers is shown. The cable sheath 4 seals off the cable from the outside.

EXAMPLE

The water-swellable hotmelt adhesives are produced as follows:

Resin ester, ethylene/vinyl acetate and acrylate copolymer are melted and homogenized at 140 to 160° C. The polydiol(s) is/are then added and homogenized. The polyvinyl methyl ether and the stabilizer are then added and homogenized. Lastly, the power-form polyacrylic acid salt is added and homogenized. In the non-blocking versions, the wax is added and homogenized last. The homogeneous melt is then introduced into appropriate containers and cooled to room temperature.

The dependability of the water-swellable hotmelt adhesive is established by the following test:

Both sides of a 0.1 mm thick polyester film are coated with the hotmelt adhesive in a thickness of 0.2 mm to at most 0.4 mm. The total layer thickness of the coated film should not exceed 1 mm. The film coated on both sides is wrapped around a Teflon rod (200 mm long, 19 mm in diameter) with a maximum overlap of 2 mm at the longitudinal seam. A glass tube with an internal diameter of 23 mm and a length of 350 mm is provided with a loose cottonwool plug at its lower end, after which the Teflon rod wrapped in the coated film is inserted into the middle of the glass tube and the upper end of the vertical glass tube is closed with another loose cottonwool plug. Arranged above the glass tube is a dropping funnel containing 250 ml of deionized water.

If the water is allowed to drip slowly into the glass tube from above, the hotmelt adhesive quickly swells to such an extent that only a few ml of water are able to flow out from the lower end of the glass tube during a brief initial phase. Thereafter there is no further penetration of water.

The water-swellable hotmelt adhesive used for the above test had the following composition:

19.5 parts of pentaerythritol ester of abietic acid;
29.8 parts of ethylene/vinyl acetate;
10.0 parts of a copolymer of ethylene, acrylic acid, vinyl acetate and vinyl alcohol;
0.2 part of sterically hindered phenol as antioxidant;
19.5 parts of polyethylene glycol, molecular weight 12,000;
20.0 parts of the sodium salt of polyacrylic acid (swelling agent); and
1.0 part of ethylene bis-stearamide (antiblocking agent).

What is claimed is:

1. A process for the production of a longitudinal watertight cable construction which comprises: applying a hot-melt adhesive sealant comprising:
   (1) a water-insoluble component A, comprising at least one water-insoluble (co)polymer and at least one other resin;
   (2) a water-soluble or water dispersible component B, comprising at least one member selected from the group consisting of water-soluble oligomers, water-dispensable oligomers, water-soluble (co)polymers and water-dispersible (co)polymers;
   (3) a water swellable component C, comprising a water-swellable (co)polymer; and
   (4) optionally tackifying additives, tack reducing additives and stabilizers, to at least one internal component of the cable whereby on contact with water the adhesive and sealant component swells and blocks flow of water in the cable in a longitudinal direction.

2. An Article of manufacture, produced by the process of claim 1.

3. The process of claim 1 wherein the hotmelt adhesive sealant comprises:
   (1) from about 15% to about 45% by weight of at least one member selected from the group consisting of resin esters and terpene/phenol resins;
   (2) about 15% to about 40% by weight of thermoplastic (co)polymer;
   (3) about 5% to about 20% by weight of acrylate copolymer;
   (4) about 5% to about 30% by weight of polyethylene glycols having a molecular weight of from 400 to 20,000;
   (5) about 5% to about 15% by weight of a polymer selected from the group consisting of polyvinyl ethyl ethers, water soluble acrylate polymers, water dispersible acrylate polymers, water-soluble copolyesters, water dispersible copolyesters and mixtures thereof;
   (6) about 15% to about 50% by weight of powder-form superabsorbers; and
   (7) about 0.2% to about 2.0% by weight stabilizers.

4. The process as claimed in claim 3, wherein the thermoplastic copolymer is ethylene/vinyl acetate copolymer.

5. The process as claimed in claim 3, wherein the powder-form superabsorber is selected from the group consisting of polyacrylic acid salts, polyacrylamide and mixtures thereof.

6. An Article of manufacture, produced by the process of claim 3.

7. The process of claim 1 wherein the hotmelt adhesive sealant comprises:
   (1) about 15% to about 45% by weight of at least one member selected from group consisting of resin esters and terpene/phenol resins;
   (2) about 15% to about 45% by weight of at least one thermoplastic (co)polymer;
   (3) about 5% to about 25% by weight of polyethylene glycol with a molecular weight of 400 to about 20,000;
   (4) about 15% to about 50% by weight of powder-form superabsorbers;
   (5) about 0.2 to about 2% by weight of stabilizer; and
   (6) about 0.5% to about 5% by weight of wax.

8. The process as claimed in claim 7, wherein the thermoplastic copolymer is ethylene/vinyl acetate copolymer.

9. The process as claimed in claim 7, wherein the powder-form superabsorber is polyacrylic acid salt.

10. The process as claimed in claim 7, wherein the wax is ethylene bis-stearamide.

11. An article of manufacture, produced by the process of claim 7.

12. A surface-tacky swellable hotmelt adhesive composition comprising:
    about 15 to about 45% by weight of resin esters or terpene/phenol resins;
    about 15 to about 40% by weight of thermoplastic copolymer;
    about 5 to about 20% by weight of acrylate copolymers;
    about 5 to about 30% by weight of polyethylene glycols having a molecular weight of from about 400 to 20,000;
    about 5 to about 15% by weight of a polymer selected from the group consisting of polyvinyl ethyl ethers, water-soluble acrylate polymers, water-dispersible acrylate polymers, water-soluble copolyesters, water-dispersible copolyesters and mixtures thereof;
    about 15 to about 50% by weight of powder-form superabsorbers; and about 0.2 to about 2.0% by weight stabilizers.

13. A process for the production of watertight constructions with a hotmelt adhesive and sealant, wherein the improvement comprises producing said watertight constructions with the composition of claim 12.

14. A non-blocking swellable hotmelt adhesive comprising:
    about 15 to about 45% by weight of at least one of resin esters, and terpene/phenol resins;
    about 15 to about 40% by weight of thermoplastic (co)polymer;
    about 5 to about 25% by weight of polyethylene glycols with a molecular weight of from 400 to 20,0000;
    about 15 to about 50% by weight of powder-form superabsorbers;
    about 0.2 to about 2.0% by weight of stabilizer; and
    about 0.5 to about 5.0% by weight of wax.

15. A process for the production of watertight constructions with a hotmelt adhesive and sealant, wherein the improvement comprises producing said watertight constructions with the composition of claim 14.

16. A swellable hotmelt adhesive composition comprising:
    about 19.5 parts of pentaerythritol ester of abietic acid;
    about 29.8 parts of ethylene/vinyl acetate;
    about 10.0 parts of a copolymer of ethylene, acrylic acid, vinyl acetate and vinyl alcohol;
    about 0.2 part of antioxidant;
    about 19.5 parts of polyethylene glycol, molecular weight 12,000;
    about 20.0 parts of the sodium salt of polyacrylic acid; and
    1.0 part of ethylene bis-stearamide.

17. The composition as claimed in claim 16, wherein the antioxidant is sterically hindered phenol.

18. A process for the production of watertight constructions with a hotmelt adhesive and sealant, wherein the improvement comprises producing said watertight constructions with the composition of claim 16.

19. The improved process of claim 18, wherein the watertight construction is a longitudinally watertight cable construction.

20. Articles of manufacture, produced by the improved process of claim 18.

21. A composition useful for bonding and coating comprising:
- a water-insoluble component A, wherein component A comprises at least one water-insoluble thermoplastic (co)polymer and at least one tackifier resin having a saponification number different from 0;
- a water soluble or water-dispersible component B, wherein component B comprises at least one substance selected from the group consisting of water dispersible oligomers, water-soluble oligomers, water-dispersible (co)polymers and water-soluble (co)polymers; and
- a water-swellable component C, wherein component C comprises a water-swellable (co)polymer;
- wherein components A, B, and C are homogeneously mixed and said composition is water-swellable and a hot melt adhesive.

22. The composition of claim 21 wherein said at least one tackifier resin is selected from the group consisting of rosin esters, polyterpenes, and terpene/phenol resins.

23. The composition of claim 21 wherein said at least one tackifier resin is a pentaerythritol ester of abietic acid.

24. The composition of claim 21 comprising 15 to 45% by weight of said at least one tackifier resin.

25. The composition of claim 21 wherein said at least one water-insoluble thermoplastic (co)polymer is selected from the group consisting of polyamides, copolyamides, polyaminoamides, polyesters, polyacrylates, polymethacrylates, polyolefins, and ethylene/vinyl acetate copolymers.

26. The composition of claim 21 wherein said at least one water-insoluble thermoplastic (co)polymer is an ethylene/vinyl acetate copolymer.

27. The composition of claim 21 comprising 15 to 40% by weight of said at least one water-insoluble thermoplastic (co)polymer.

28. The composition of claim 21 wherein component B comprises at least one substance selected from the group consisting of polyethylene glycols, polyvinyl methyl ethers, polyvinyl pyrrolidones, copolymers of vinyl methyl ether, copolymers of vinyl pyrrolidone, water-soluble polyesters, water-dispersible polyesters, water-soluble copolyesters, water-dispersible copolyesters, water-soluble acrylate polymers, water-dispersible acrylate polymers and mixtures thereof.

29. The composition of claim 21, wherein component B is comprised of polyethylene glycol.

30. The composition of claim 21 comprising 5 to 40% by weight polyethylene glycol.

31. The composition of claim 21 additionally comprising at least one tack-reducing additive.

32. The composition of claim 21 additionally comprising at least one wax additive.

33. The composition of claim 21 additionally comprising at least one bis-stearamide wax.

34. The composition of claim 21 additionally comprising 0.5 to 5.0% by weight of waxes.

35. The composition of claim 21 wherein component C comprises a water-swellable (co)polymer selected from the group consisting of graft copolymers of starch and cellulose with one or more monomers selected from acrylonitrile, acrylic acid, and acrylamide, carboxy methyl cellulose, maleic anhydride/poly-co-olefin copolymer, polyacrylamide, polyacrylic acid, salts of polyacrylic acid, copolymers of acrylic acid and acrylate esters, and copolymers of acrylamide with acrylate esters.

36. The composition of claim 21 wherein component C comprises one or more powder-form polyacrylic acid salts.

37. The composition of claim 21 comprising 15 to 50% by weight powder-form superabsorbers.

38. A composition useful for bonding and coating comprising:
- a water-insoluble component A, wherein component A comprises at least one ethylene/vinyl acetate copolymer and at least one tackifier resin having a saponification number different than 0 selected from the group consisting of rosin esters, polyterpenes, and terpene/phenol resins;
- a water-soluble or water-dispersible component B, wherein component B comprises at least one polyethylene glycol; and
- a water-swellable component C, wherein component C comprises at least one powder-form polyacrylic acid salt;
- wherein said composition is water-swellable and a hot melt adhesive.

39. The composition of claim 38 wherein component A is additionally comprised of a polyacrylate.

40. The composition of claim 38 wherein component B is comprised of a polyethylene glycol having a molecular weight of 400 to 20,000.

41. A composition useful for bonding and coating comprising:
(a) at least one tackifier having a saponification number different than 0 selected from the group consisting of rosin esters and terpene/phenol resins;
(b) at least one ethylene/vinyl acetate copolymer;
(c) at least one acrylate copolymer;
(d) at least one polyethylene glycol;
(e) at least one substance selected from the group consisting of polyvinyl methyl esters, copolymers of vinyl methyl ether, copolymers of vinyl pyrrolidone, water-soluble acrylate polymers, water-dispersible acrylate polymers, water-soluble copolyesters, and water-dispersible copolyesters;
(f) at least one powder-form superabsorber selected from the group consisting of polyacrylic acid salts and polyacrylamides; and
(g) at least one stabilizer;
wherein said composition is surface-tacky, water-swellable, and a hot melt adhesive.

42. A composition useful for bonding and coating comprising:
(a) at least one tackifier having a saponification number different from 0 selected from the group consisting of rosin esters and terpene/phenol resins;
(b) at least one ethylene/vinyl acetate copolymer;
(c) at least one polyethylene glycol;
(d) at least one powder-form polyacrylic acid salt;
(e) at least one stabilizer; and
(f) at least one wax;

wherein said composition is non-blocking, water-swellable and a hot melt adhesive.

43. A cable construction comprised of a central reinforcing element, optical fibers and a composition comprising:
   a water-insoluble component A, wherein component A comprises at least one water-insoluble thermoplastic (co)polymer and at least one tackifier resin having a saponification number different from 0;
   a water soluble or water-dispersible component B, wherein component B comprises at least one substance selected from the group consisting of water dispersible oligomers, water-soluble oligomers, water-dispersible (co)polymers and water-soluble (co)polymers; and
   a water-swellable component C, wherein component C comprises a water-swellable (co)polymer;
   wherein components A, B, and C are homogeneously mixed and said composition is water-swellable and a hot melt adhesive.

44. The cable construction of claim 43 wherein said optical fibers are arranged concentrically around said central reinforcing element and are bonded to said central reinforcing element by said composition.

45. The cable construction of claim 44 wherein said optical fibers are contained in tubes coated with said composition.

46. A cable construction comprised of a central reinforcing element, optical fibers and a composition comprising:
   a water-insoluble component A, wherein component A comprises at least one ethylene/vinyl acetate copolymer and at least one tackifier resin having a saponification number different than 0 selected from the group consisting of rosin esters, polyterpenes, and terpene/phenol resins;
   a water-soluble or water-dispersible component B, wherein component B comprises at least one polyethylene glycol; and
   a water-swellable component C, wherein component C comprises at least one powder-form polyacrylic acid salt;
   wherein said composition is water-swellable and a hot melt adhesive.

47. The cable construction of claim 46 wherein said optical fibers are arranged concentrically around said central reinforcing element and are bonded to said central reinforcing element by said composition.

48. The cable construction of claim 47 wherein said optical fibers are contained within tubes coated with said composition.

49. A method of making a cable construction comprising bonding optical fibers to a central reinforcing element using a composition comprising:
   a water-insoluble component A, wherein component A comprises at least one water-insoluble thermoplastic (co)polymer and at least one tackifier resin having a saponification number different from 0;
   a water soluble or water-dispersible component B, wherein component B comprises at least one substance selected from the group consisting of water dispersible oligomers, water-soluble oligomers, water-dispersible (co)polymers and water-soluble (co)polymers; and
   a water-swellable component C, wherein component C comprises a water-swellable (co)polymer;
   wherein components A, B, and C are homogeneously mixed and said composition is water-swellable and a hot melt adhesive.

50. The method of claim 49 wherein the central reinforcing element is first coated with said composition prior to the bonding of the optical fibers to the central reinforcing element.

51. The method of claim 49 wherein the optical fibers are contained in tubes and the tubes are coated with said composition.

52. A method of making a cable construction comprising bonding optical fibers to a central reinforcing element using a composition comprising:
   a water-insoluble component A, wherein component A comprises at least one ethylene/vinyl acetate copolymer and at least one tackifier resin having a saponification number different than 0 selected from the group consisting of rosin esters, polyterpenes, and terpene/phenol resins;
   a water-soluble or water-dispersible component B, wherein component B comprises at least one polyethylene glycol; and
   a water-swellable component C, wherein component C comprises at least one powder-form polyacrylic acid salt;
   wherein said composition is water-swellable and a hot melt adhesive.

53. The method of claim 52 wherein the central reinforcing element is first coated with said composition prior to the bonding of the optical fibers to the central reinforcing element.

54. A cable construction comprised of a central reinforcing element and optical fibers contained in tubes, wherein said tubes are arranged concentrically around said central reinforcing element and bonded to said central reinforcing element with a water-swellable hot melt adhesive.

55. The cable construction of claim 54 additionally comprising a cable sheath.

56. The cable construction of claim 54 wherein the water-swellable hot melt adhesive is comprised of at least one water-insoluble thermoplastic (co)polymer, at least one tackifier resin, at least one substance selected from the group consisting of water-dispersible oligomers, water-soluble oligomers, water-dispersible (co)polymers, and water-soluble (co)polymers, and at least one water-swellable (co)polymer.

* * * * *